US011351855B2

(12) United States Patent
Gambhira

(10) Patent No.: US 11,351,855 B2
(45) Date of Patent: Jun. 7, 2022

(54) MULTI-MODE HYBRID MODULE

(71) Applicant: Schaeffler Technologies AG & Co. KG, Herzogenaurach (DE)

(72) Inventor: Ullekh Raghunatha Gambhira, Wooster, OH (US)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 0 days.

(21) Appl. No.: 16/875,296

(22) Filed: May 15, 2020

(65) Prior Publication Data
US 2021/0354546 A1    Nov. 18, 2021

(51) Int. Cl.
*B60K 6/38* (2007.10)
*B60K 6/24* (2007.10)
*B60K 6/36* (2007.10)
*B60K 17/22* (2006.01)
*F16D 11/14* (2006.01)
*F16D 25/061* (2006.01)
(Continued)

(52) U.S. Cl.
CPC .............. *B60K 6/38* (2013.01); *B60K 6/24* (2013.01); *B60K 6/26* (2013.01); *B60K 6/36* (2013.01); *B60K 17/22* (2013.01); *F16D 11/14* (2013.01); *F16D 13/52* (2013.01); *F16D 21/06* (2013.01); *F16D 25/061* (2013.01); *F16D 25/0638* (2013.01); *F16D 2011/004* (2013.01); *F16D 2021/0653* (2013.01); *F16D 2021/0661* (2013.01); *F16D 2021/0692* (2013.01); *F16D 2121/04* (2013.01)

(58) Field of Classification Search
CPC .... F16H 45/02; F16D 2011/00; F16D 25/061; F16D 11/14; B60K 3/38
See application file for complete search history.

(56) References Cited

U.S. PATENT DOCUMENTS 7,509,802 B2 *  3/2009  Hammond ............... B60K 6/26
                                                  60/330
9,140,311 B2 *  9/2015  Iwase ..................... B60L 50/16
(Continued)

FOREIGN PATENT DOCUMENTS

DE    102018217388 A1 *  4/2020 ............... B60K 6/48
JP       2010163050 A      7/2010
(Continued)

*Primary Examiner* — Stacey A Fluhart
(74) *Attorney, Agent, or Firm* — Kevin L Parks

(57) ABSTRACT

A multi-mode hybrid module includes a fluid coupling, an electric motor and a first clutch. The fluid coupling includes a fluid coupling housing, an impeller drivingly connected to the fluid coupling housing, and a turbine arranged for driving connection to a transmission input shaft. The electric motor includes a nonrotatable stator and a rotatable rotor including a rotor carrier. The first clutch is arranged to drivingly connect the rotor carrier directly to the transmission input shaft. In some example embodiments, the first clutch is a dog clutch. In some example embodiments, the multi-mode hybrid module includes a first clutch actuator. The first clutch has an axially slidable sleeve arranged to selectively rotationally connect the rotor carrier and the transmission input shaft, and the first clutch actuator is arranged to displace the axially slidable sleeve to connect and disconnect the rotor carrier and the transmission input shaft.

18 Claims, 1 Drawing Sheet

(51) Int. Cl.
*F16D 13/52* (2006.01)
*F16D 25/0638* (2006.01)
*F16D 21/06* (2006.01)
*B60K 6/26* (2007.10)
*F16D 121/04* (2012.01)
*F16D 11/00* (2006.01)

(56) References Cited

U.S. PATENT DOCUMENTS

| | | | |
|---|---|---|---|
| 2004/0130225 A1* | 7/2004 | Mencher | B60K 6/485 |
| | | | 310/78 |
| 2005/0155831 A1* | 7/2005 | Masuya | F16H 45/02 |
| | | | 192/3.3 |
| 2013/0165294 A1 | 6/2013 | Reitz | |
| 2014/0144742 A1* | 5/2014 | Sperrfechter | B60K 6/405 |
| | | | 192/3.29 |
| 2019/0375286 A1 | 12/2019 | Lahr et al. | |
| 2020/0039496 A1 | 2/2020 | Lindemann et al. | |
| 2020/0040976 A1 | 2/2020 | Steiner et al. | |
| 2020/0094668 A1* | 3/2020 | Podschwadt | F16H 41/24 |

FOREIGN PATENT DOCUMENTS

| | | | | |
|---|---|---|---|---|
| WO | WO-2016136510 A1 * | 9/2016 | | F16H 45/02 |
| WO | 2020011707 A1 | 1/2020 | | |

* cited by examiner

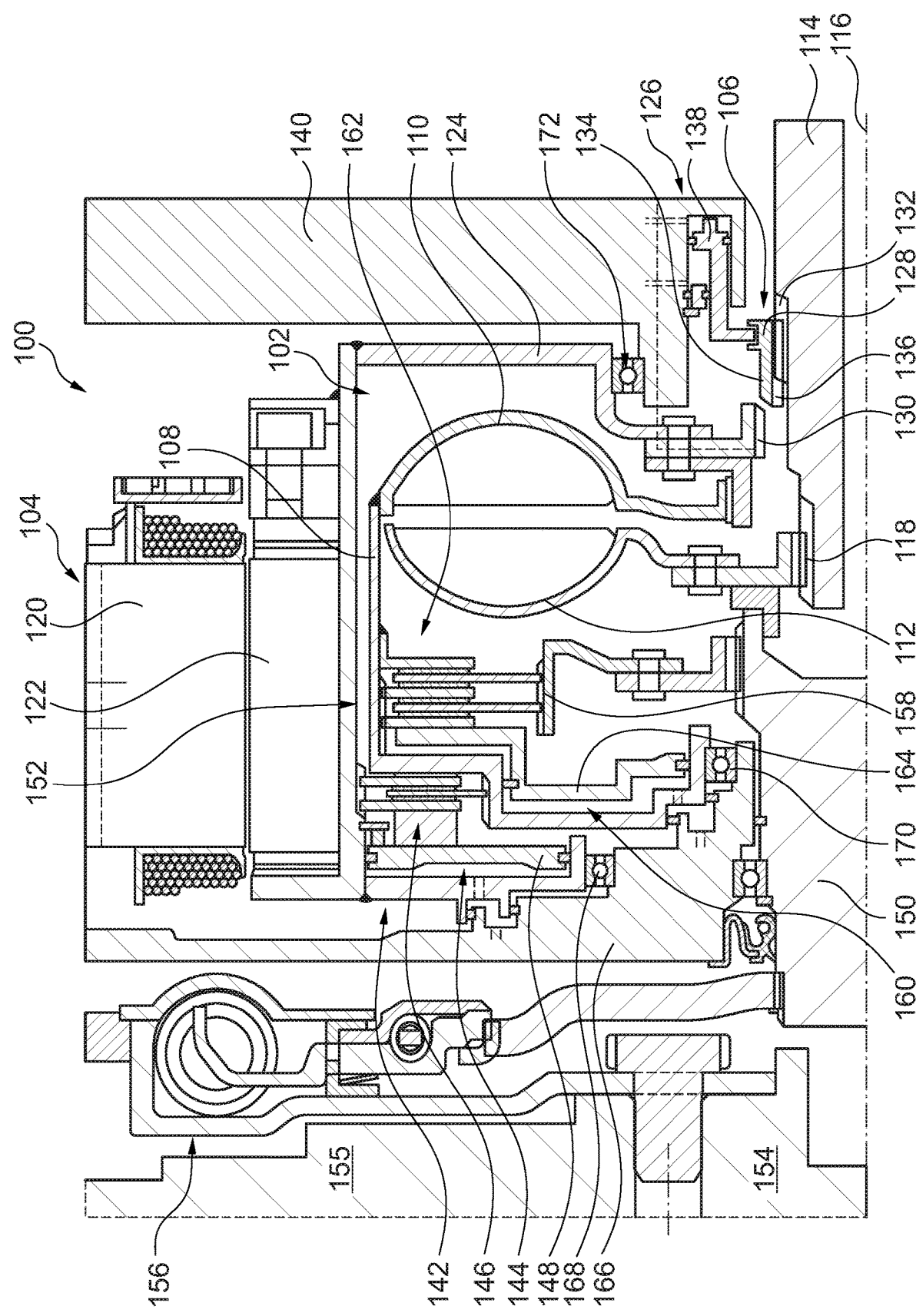

MULTI-MODE HYBRID MODULE

TECHNICAL FIELD

The present disclosure relates generally to a hybrid module, and more specifically to a multi-mode hybrid module.

BACKGROUND

Hybrid modules are known. One example is shown and described in commonly assigned United States Patent Application Publication No. 2020/0039496, hereby incorporated by reference as if set forth fully herein.

SUMMARY

Example embodiments broadly comprise a multi-mode hybrid module, including a fluid coupling, an electric motor and a first clutch. The fluid coupling includes a fluid coupling housing, an impeller drivingly connected to the fluid coupling housing, and a turbine arranged for driving connection to a transmission input shaft. The electric motor includes a nonrotatable stator and a rotatable rotor including a rotor carrier. The first clutch is arranged to drivingly connect the rotor carrier directly to the transmission input shaft. In some example embodiments, the first clutch is a dog clutch.

In some example embodiments, the multi-mode hybrid module includes a first clutch actuator. The first clutch has an axially slidable sleeve arranged to selectively rotationally connect the rotor carrier and the transmission input shaft, and the first clutch actuator is arranged to displace the axially slidable sleeve to connect and disconnect the rotor carrier and the transmission input shaft. In an example embodiment, the rotor carrier has a first inner spline, the transmission input shaft has a first outer spline, and the axially slidable sleeve has a second outer spline complementary to the first inner spline and a second inner spline complementary to the first outer spline. In an example embodiment, the first clutch actuator includes a first hydraulically actuated piston arranged in a hybrid module housing or a transmission housing.

In some example embodiments, the multi-mode hybrid module includes a second clutch arranged to drivingly connect the rotor carrier directly to the fluid coupling housing. In some example embodiments, the multi-mode hybrid module includes a second clutch actuator. The second clutch has a first clutch pack, and the second clutch actuator is arranged to compress the first clutch pack to drivingly connect the rotor carrier to the fluid coupling housing. In an example embodiment, the second clutch actuator includes a second hydraulically actuated piston arranged in the rotor carrier.

In some example embodiments, the multi-mode hybrid module includes a K0 shaft arranged for driving connection to a crankshaft of an internal combustion engine, and a third clutch arranged to drivingly connect the K0 shaft to the fluid coupling housing. In an example embodiment, the K0 shaft has a clutch carrier and the third clutch is arranged to drivingly connect the clutch carrier directly to the fluid coupling housing. In some example embodiments, the multi-mode hybrid module includes a third clutch actuator. The third clutch has a second clutch pack, and the third clutch actuator is arranged to compress the second clutch pack to drivingly connect the K0 shaft and the fluid coupling housing. In an example embodiment, the third clutch actuator includes a third hydraulically actuated piston arranged in the fluid coupling housing.

In some example embodiments, the multi-mode hybrid module includes a hybrid module housing, a first bearing arranged to support the rotor carrier on the hybrid module housing, and a second bearing arranged to support the fluid coupling housing on the hybrid module housing. In an example embodiment, the multi-mode hybrid module includes a third bearing arranged to support the rotor carrier on the hybrid module housing or a transmission housing.

Other example aspects broadly comprise a multi-mode hybrid module including a fluid coupling, an electric motor, a first clutch and a second clutch. The fluid coupling includes a fluid coupling housing, an impeller drivingly connected to the fluid coupling housing, and a turbine arranged for connection to a transmission input shaft. The electric motor includes a nonrotatable stator and a rotatable rotor with a rotor carrier. The first clutch is arranged to drivingly connect the rotor carrier to the transmission input shaft, and the second clutch is arranged to drivingly connect the rotor carrier to the fluid coupling housing. In an example embodiment, the multi-mode hybrid module includes a K0 shaft arranged for driving connection to a crankshaft of an internal combustion engine and a third clutch arranged to drivingly connect the K0 shaft to the fluid coupling housing.

BRIEF DESCRIPTION OF THE DRAWINGS

The single FIGURE illustrates a top half cross-sectional view of a multi-mode hybrid module according to an example embodiment.

DETAILED DESCRIPTION

Embodiments of the present disclosure are described herein. It should be appreciated that like drawing numbers appearing in different drawing views identify identical, or functionally similar, structural elements. Also, it is to be understood that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the embodiments. As those of ordinary skill in the art will understand, various features illustrated and described with reference to any one of the FIGURES can be combined with features illustrated in one or more other FIGURES to produce embodiments that are not explicitly illustrated or described. The combinations of features illustrated provide representative embodiments for typical applications. Various combinations and modifications of the features consistent with the teachings of this disclosure, however, could be desired for particular applications or implementations.

The terminology used herein is for the purpose of describing particular aspects only, and is not intended to limit the scope of the present disclosure. Unless defined otherwise, all technical and scientific terms used herein have the same meaning as commonly understood to one of ordinary skill in the art to which this disclosure belongs. Although any methods, devices or materials similar or equivalent to those described herein can be used in the practice or testing of the disclosure, the following example methods, devices, and materials are now described.

The following description is made with reference to the single FIGURE. The single FIGURE illustrates a top half cross-sectional view of multi-mode hybrid module 100 according to an example embodiment. Multi-mode hybrid module 100 includes fluid coupling 102, electric motor 104 and clutch 106. The fluid coupling includes fluid coupling housing 108, impeller 110 drivingly connected to the fluid coupling housing, and turbine 112 arranged for driving connection to transmission input shaft 114. In this context, drivingly connect means that the component rotate together about axis 116 in the same direction at the same speed, and arranged for driving connection means that the turbine is engageable with the transmission input shaft e.g., via spline connection 118 in this embodiment, when the multi-mode hybrid module is assembled with a transmission.

The electric motor includes nonrotatable stator 120 and rotatable rotor 122 with rotor carrier 124. Clutch 106 arranged to drivingly connect the rotor carrier directly to the transmission input shaft as described below. Here, directly means that there are no other disconnecting devices between the two components. So, when clutch 106 is engaged, the rotor carrier and the input shaft always rotate together regardless of the operation of other clutches or disconnect devices in the driveline. In the example embodiment shown, clutch 106 is a dog clutch.

Hybrid module 100 includes clutch actuator 126 arranged for engaging the dog clutch. That is, clutch 106 includes axially slidable sleeve 128 arranged to selectively rotationally connect the rotor carrier and the transmission input shaft, and clutch actuator 126 is arranged to displace the axially slidable sleeve to connect and disconnect the rotor carrier and the transmission input shaft. As depicted in the FIGURE, the rotor carrier includes inner spline 130, the transmission input shaft includes outer spline 132, and the axially slidable sleeve includes outer spline 134 complementary to inner spline 130 and inner spline 136 complementary to outer spline 132. Splines 132 and 136 rotationally fix the sleeve to the input shaft and actuator 126 axially displaces the sleeve to engage and disengage splines 130 and 134 to rotationally fix splines 130 and 132 to drivingly connect the rotor carrier to the input shaft. Clutch actuator 126 includes hydraulically actuated piston 138 arranged in a hybrid module housing (partially shown at 140) or a transmission housing (not shown). Here, hydraulically actuated means that the piston is displaced by pressurized hydraulic fluid. The pressurized hydraulic fluid may be provided by a transmission pump, an external electrically-driven pump, an accumulator, or another device, for example.

Multi-mode hybrid module 100 also includes clutch 142 arranged to drivingly connect the rotor carrier directly to the fluid coupling housing and clutch actuator 144. Clutch 142 includes clutch pack 146 and clutch actuator 144 is arranged to compress clutch pack 146 to drivingly connect the rotor carrier and the fluid coupling housing. That is, clutch pack 146 includes interleaved clutch plates with some rotationally fixed to the rotor carrier and some rotationally fixed to the fluid coupling housing. When the actuator compresses the interleaved clutch plates together, the resulting frictional force between the clutch plates rotationally connects the rotor carrier to the fluid coupling housing. In the embodiment shown, clutch actuator 144 includes hydraulically actuated piston 148 arranged in the rotor carrier.

Multi-mode hybrid module 100 also includes K0 shaft 150 and clutch 152. The K0 shaft is arranged for driving connection to crankshaft 154 of an internal combustion engine (partially shown at 155). In the embodiment shown, shaft 150 is rotationally connected to the crankshaft through damper 156 which provides torsional isolation between the K0 shaft and the crankshaft. In other words, the damper allows torsional flexibility between the crankshaft and the K0 shaft to reduce torsional accelerations from cylinder firing in the combustion engine. While slight speed variations may exist between the crankshaft and the K0 shaft, an average rotational speed of the two components is the same.

Clutch 152 is arranged to drivingly connect the K0 shaft to the fluid coupling housing. In the embodiment shown, the K0 shaft includes clutch carrier 158 and clutch 152 is arranged to drivingly connect the clutch carrier directly to the fluid coupling housing. Hybrid module 100 also includes clutch actuator 160. Clutch 152 includes clutch pack 162 and actuator 160 is arranged to compress clutch pack 162 to drivingly connect the K0 shaft to the fluid coupling housing in a manner similar to clutch pack 146 described above. In the embodiment shown, clutch actuator 160 includes hydraulically actuated piston 164 arranged in the fluid coupling housing.

Multi-mode hybrid module 100 includes hybrid module housing 166, bearing 168 arranged to support the rotor carrier on the hybrid module housing, and bearing 170 arranged to support the fluid coupling housing on the hybrid module housing. The hybrid module also includes bearing 172 arranged to support the rotor carrier on the hybrid module housing or a transmission housing (not shown).

During operation of a hybrid vehicle equipped with hybrid module 100, the rotor can be used for combustion engine startup by engaging clutches 142 and 152 to provide cranking torque through the K0 shaft and damper. Clutch 106 remains disengaged and the transmission can be engaged in a drive or neutral configuration. After startup, launch using the combustion engine is accomplished by disengaging clutch 142 while clutch 152 remains engaged so that torque is transmitted from the combustion engine through fluid coupling 102 and turbine 112 to the transmission. During launch, the electric motor can boost through the fluid coupling by engaging clutch 142 or directly to the input shaft by engaging clutch 106. Engaging clutch 106 transmits less torque through the fluid coupling resulting in lower fluid temperatures and may improve performance during towing, for example.

Once launched, the vehicle can operate through the fluid coupling (with clutch 142 engaged to drive through the electric motor or clutch 152 engaged to drive through the combustion engine), from the combustion engine through the fluid coupling in a locked state (clutches 106, 142 and 152 engaged), or directly from the electric motor to the transmission (with clutch 106 engaged). In the locked state, the electric motor can be used to provide boost or operate in a regen mode to charge batteries. While clutches 142 and 152 are engaged, clutch 106 may be disengaged to provide battery charging through the electric motor while the vehicle is stationary (even if the transmission is engaged in a drive configuration). The combustion engine may be shut off for electric only driving by disengaging clutch 152. Engaging clutch 106 and disengaging clutch 152 permits battery charging through simulated engine braking using the electric motor when the vehicle is coasting, for example.

The vehicle may also be launched with the electric motor by engaging clutch 106 and disengaging clutch 152. Clutch 142 can be engaged to reduce drag losses from the impeller. During electric-only driving, the combustion engine may be started by disengaging clutch 142 and engaging clutch 152 allowing torque transfer from the electric motor to the turbine, fluid coupling, K0 shaft, and damper for a smooth startup. Once started, combusting engine torque can be used to propel the vehicle through the fluid coupling, or direct to the transmission by engaging clutches 106, 142, and 152. A rolling combustion engine startup can be performed by disengaging clutch 106 and engaging clutches 142 and 152.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the disclosure that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, to the extent any embodiments are described as less desirable than other embodiments or prior art implementations with respect to one or more characteristics, these embodiments are not outside the scope of the disclosure and can be desirable for particular applications.

REFERENCE NUMERALS

100 Multi-mode hybrid module
102 Fluid coupling
104 Electric motor
106 Clutch (first)
108 Fluid coupling housing
110 Impeller
112 Turbine
114 Transmission input shaft
116 Axis
118 Spline connection (turbine to input shaft)
120 Stator (electric motor)
122 Rotor (electric motor)
124 Rotor carrier
126 Clutch actuator (first)
128 Axially slidable sleeve
130 Inner spline (first)
132 Outer spline (first)
134 Outer spline (second)
136 Inner spline (second)
138 Hydraulically actuated piston (first)
140 Hybrid module housing
142 Clutch (second)
144 Clutch actuator (second)
146 Clutch pack (first)
148 Hydraulically actuated piston (second)
150 K0 shaft
152 Clutch (third)
154 Crankshaft
155 Internal combustion engine (partial)
156 Damper
158 Clutch carrier
160 Clutch actuator (third)
162 Clutch pack (second)
164 Hydraulically actuated piston (third)
166 Hybrid module housing
168 Bearing (first)
170 Bearing (second)
172 Bearing (third)

What is claimed is:

1. A multi-mode hybrid module, comprising:
    a fluid coupling comprising:
        a fluid coupling housing;
        an impeller drivingly connected to the fluid coupling housing; and
        a turbine arranged for driving connection to a transmission input shaft;
    an electric motor comprising:
        a nonrotatable stator; and
        a rotatable rotor including a rotor carrier;
    a first clutch arranged to drivingly connect the rotor carrier directly to the transmission input shaft; and
    a second clutch arranged to drivingly connect the rotor carrier directly to the fluid coupling housing.

2. The multi-mode hybrid module of claim 1 wherein the first clutch is a dog clutch.

3. The multi-mode hybrid module of claim 2 further comprising a first clutch actuator, wherein:
    the first clutch comprises an axially slidable sleeve arranged to selectively rotationally connect the rotor carrier and the transmission input shaft; and
    the first clutch actuator is arranged to displace the axially slidable sleeve to connect and disconnect the rotor carrier and the transmission input shaft.

4. The multi-mode hybrid module of claim 3 wherein:
    the rotor carrier comprises a first inner spline;
    the transmission input shaft comprises a first outer spline; and
    the axially slidable sleeve comprises a second outer spline complementary to the first inner spline and a second inner spline complementary to the first outer spline.

5. The multi-mode hybrid module of claim 3 wherein the first clutch actuator includes a first hydraulically actuated piston arranged in a hybrid module housing or a transmission housing.

6. The multi-mode hybrid module of claim 1 further comprising a second clutch actuator, wherein:
    the second clutch comprises a first clutch pack; and
    the second clutch actuator is arranged to compress the first clutch pack to drivingly connect the rotor carrier to the fluid coupling housing.

7. The multi-mode hybrid module of claim 6 wherein the second clutch actuator includes a second hydraulically actuated piston arranged in the rotor carrier.

8. The multi-mode hybrid module of claim 1 further comprising:
    a K0 shaft arranged for driving connection to a crankshaft of an internal combustion engine; and
    a third clutch arranged to drivingly connect the K0 shaft to the fluid coupling housing.

9. The multi-mode hybrid module of claim 8 wherein the K0 shaft comprises a clutch carrier and the third clutch is arranged to drivingly connect the clutch carrier directly to the fluid coupling housing.

10. The multi-mode hybrid module of claim 8 further comprising a clutch actuator, wherein:
    the third clutch comprises a clutch pack; and
    the clutch actuator is arranged to compress the clutch pack to drivingly connect the K0 shaft and the fluid coupling housing.

11. The multi-mode hybrid module of claim 10 wherein the clutch actuator includes a hydraulically actuated piston arranged in the fluid coupling housing.

12. The multi-mode hybrid module of claim 1 further comprising:
   a hybrid module housing;
   a first bearing arranged to support the rotor carrier on the hybrid module housing; and
   a second bearing arranged to support the fluid coupling housing on the hybrid module housing.

13. The multi-mode hybrid module of claim 12 further comprising a third bearing arranged to support the rotor carrier on the hybrid module housing or a transmission housing.

14. A multi-mode hybrid module, comprising:
   a fluid coupling comprising:
      a fluid coupling housing;
      an impeller drivingly connected to the fluid coupling housing; and
      a turbine arranged for connection to a transmission input shaft;
   an electric motor comprising:
      a nonrotatable stator; and
      a rotatable rotor including a rotor carrier; and
   a first clutch arranged to drivingly connect the rotor carrier to the transmission input shaft; and
   a second clutch arranged to drivingly connect the rotor carrier to the fluid coupling housing.

15. The multi-mode hybrid module of claim 14 further comprising:
   a K0 shaft arranged for driving connection to a crankshaft of an internal combustion engine; and
   a third clutch arranged to drivingly connect the K0 shaft to the fluid coupling housing.

16. A multi-mode hybrid module, comprising:
   a fluid coupling comprising:
      a fluid coupling housing;
      an impeller drivingly connected to the fluid coupling housing; and
      a turbine arranged for driving connection to a transmission input shaft;
   an electric motor comprising:
      a nonrotatable stator; and
      a rotatable rotor including a rotor carrier; and
   a first clutch arranged to drivingly connect the rotor carrier directly to the transmission input shaft;
   a K0 shaft arranged for driving connection to a crankshaft of an internal combustion engine, the K0 shaft comprising a clutch carrier; and
   a friction clutch arranged to drivingly connect the clutch carrier directly to the fluid coupling housing.

17. The multi-mode hybrid module of claim 16 further comprising a friction clutch actuator, wherein:
   the friction clutch comprises a clutch pack; and
   the friction clutch actuator is arranged to compress the clutch pack to drivingly connect the clutch carrier directly to the fluid coupling housing.

18. The multi-mode hybrid module of claim 17 wherein the friction clutch actuator includes a hydraulically actuated piston arranged in the fluid coupling housing.

* * * * *